United States Patent
Liu et al.

(10) Patent No.: US 11,303,128 B2
(45) Date of Patent: Apr. 12, 2022

(54) SUPPRESSION METHOD OF HIGH-FREQUENCY RESONANCE FOR VSC-HVDC SYSTEM BASED ON NONLINEAR FILTER IN VOLTAGE FEED-FORWARD CONTROL

(71) Applicants: BEIJING SIFANG AUTOMATION CO., LTD., Beijing (CN); BEIJING SIFANG ENGINEERING CO., LTD., Beijing (CN)

(72) Inventors: Bin Liu, Beijing (CN); Fengmei Cao, Beijing (CN); Shu Liu, Beijing (CN); Hongming Mei, Beijing (CN); Zhichao Liu, Beijing (CN); Hongxia Qin, Beijing (CN); Xiaoyu Zhang, Beijing (CN); Hualong Yu, Beijing (CN); Xianchao Guo, Beijing (CN); Jing Wen, Beijing (CN)

( * ) Notice: Subject to any disclaimer, the term of this patent is extended or adjusted under 35 U.S.C. 154(b) by 0 days.

(21) Appl. No.: 16/484,526

(22) PCT Filed: Feb. 22, 2019

(86) PCT No.: PCT/CN2019/075908
§ 371 (c)(1),
(2) Date: May 28, 2020

(87) PCT Pub. No.: WO2020/155235
PCT Pub. Date: Aug. 6, 2020

(65) Prior Publication Data
US 2020/0295568 A1 Sep. 17, 2020

(30) Foreign Application Priority Data

Jan. 28, 2019 (CN) .......................... 201910078266.0

(51) Int. Cl.
*H02J 3/24* (2006.01)
*H02J 3/36* (2006.01)
(52) U.S. Cl.
CPC ........ *H02J 3/36* (2013.01); *H02J 3/24* (2013.01); *H02J 3/241* (2020.01); *G05B 2219/25409* (2013.01); *H02J 2003/365* (2013.01)
(58) Field of Classification Search
CPC ........ H02J 3/24; H02J 3/241; H02J 2003/365; H02J 3/36; G05B 2219/25409;
(Continued)

(56) References Cited

U.S. PATENT DOCUMENTS

| | | | | |
|---|---|---|---|---|
| 5,296,764 | A | * | 3/1994 | Asplund ................... H02J 3/01 327/553 |
| 2013/0214717 | A1 | * | 8/2013 | Ishikawa ............... H02M 5/458 318/503 |
| 2018/0123444 | A1 | * | 5/2018 | Mohanaveeramani ...... H02M 5/293 |

FOREIGN PATENT DOCUMENTS

| | | |
|---|---|---|
| CN | 102291023 A | 12/2011 |
| CN | 102664545 A | 9/2012 |

(Continued)

OTHER PUBLICATIONS

Ruihua, Song; Chao, Zheng; Ruomei, Li; Xiaoxin, Zhou; VSC's based HVDC and its control strategy; 2005 IEEE/PES Transmission and Distribution Conference & ExhibitionL Asia and Pacific; Aug. 18, 2005, pp. 1-6. (Year: 2005).*

(Continued)

*Primary Examiner* — Harry R Behm
(74) *Attorney, Agent, or Firm* — Millman IP Inc.

(57) ABSTRACT

A suppression method of high-frequency resonance for VSC-HVDC (Voltage Source Converter-High Voltage Direct Current Transmission) system based on nonlinear (Continued)

filter in voltage feed-forward control. It includes that the nonlinear filter is used for the voltage feed-forward link in the current inner loop control. The specific method is to extract each sequence component of the AC (Alternating Current) voltage, calculate the average value of the sequence component at N sample points, compare the current average value with the output result of nonlinear filter in the previous period, and output the result of nonlinear filter in the current period. After corrected, the result is a fixed value varying according to gradient which acts on the voltage feed-forward link of the inner loop. The invention can effectively suppress the high frequency resonance caused by impedance matching between VSC-HVDC system and grid system without losing the rapidity, and at the same time, it can adjust with AC voltage when voltage disturbance such as AC fault occurs, so as to reduce the risk of over-current of the converter valve. At present, the invention only needs to be realized in the secondary control software link without adding a new equipment, which is also low cost, no occupancy of land and convenient for engineering practice.

5 Claims, 2 Drawing Sheets

(58) Field of Classification Search
CPC ........... G05B 2219/41012; G05B 2219/41199; G05B 2219/41233; G05B 2219/41435
See application file for complete search history.

(56) References Cited

FOREIGN PATENT DOCUMENTS

| | | |
|---|---|---|
| CN | 107404124 A | 11/2017 |
| DE | 102004012215 A1 | 9/2005 |

OTHER PUBLICATIONS

Yin Ming, Li Gengyin, Li Guangkai, Liang Haifeng, Zhou Ming; Modeling of VSC-HVDC and ITs Active Power Control Scheme; 2004 International Conference on Power System Techonolgy—POWERCOM 2004; Nov. 24, 2004, pp. 1351-1355. (Year: 2004).*
Wang Yan, Zhao Shu-zhen, Ruan Jiang-jun, Huangfu Cheng; Dynamic Model and Control of Voltage Source Converter Based HVDC, IEEE 2009 Power and Energy Conference, Jun. 2009, 5 pages. (Year: 2009).*
International Search Report dated Nov. 5, 2019 in connection with International Application No. PCT/CN2019/075908.
English translation of Chinese Publication No. CN107404124A.
English translation of Chinese Publication No. CN102291023A.
English translation of Chinese Publication No. CN102664545A.
English translation of German Publication No. DE102004012215A1.
Written Opinion dated Nov. 5, 2019 in connection with International Application No. PCT/CN2019/075908 dated Nov. 5, 2019.

* cited by examiner

SUPPRESSION METHOD OF HIGH-FREQUENCY RESONANCE FOR VSC-HVDC SYSTEM BASED ON NONLINEAR FILTER IN VOLTAGE FEED-FORWARD CONTROL

FIELD OF THE INVENTION

The present invention relates to the VSC-HVDC system which belongs to the technical field of high voltage transmission, and more specifically to a suppression method of high-frequency resonance for VSC-HVDC system.

BACKGROUND OF THE INVENTION

There is a high-frequency resonance risk between the VSC-HVDC system and the AC system. The main reason is that the control link of VSC-HVDC system is complex. It is usually composed of measurement link, unit control system and valve pole control system in series. It includes the time delay caused by link communication and calculation processing. The time delay will produce negative damping characteristics in closed-loop control and the voltage feed-forward is the main part. If the AC system also shows weak damping characteristics in the high frequency band, there will be high-frequency resonance between the VSC-HVDC system and AC system due to insufficient overall damping.

The problem of high-frequency resonance between the VSC-HVDC system and AC system is a newly engineering problem discovered in the past year and the research on this problem is still in its infancy. Among the existing technical schemes, some scholars have proposed a method to apply low-pass filter on the voltage feed-forward link to suppress the high-frequency resonance problem. However, the low-pass filter can not completely filter the harmonics in the high frequency band, and at the same time further increases the delay of the voltage feed-forward link, which will transfer the high frequency resonance to the lower frequency direction and result in the medium and high-frequency resonance. The delay will also affect the AC Fault-Crossing performance of the VSC-HVDC system.

Therefore, a suppression method of high-frequency resonance for the VSC-HVDC system based on nonlinear filter in voltage feed-forward is proposed, which mainly performs nonlinear filtering on the inner loop voltage feed-forward of the unit control system. The invention can effectively improve the impedance characteristics in high frequency band, thereby effectively suppressing the high-frequency resonance caused by the impedance matching between the VSC-HVDC system and AC system, taking into account the rapidity, and can adjust the AC voltage when the voltage disturbance of AC fault occurs, so as to reduce the risk of overcurrent of the converter valve. At present, the invention only needs to be realized in the secondary control software link without adding a new equipment, which is also low cost, no occupancy of land and convenient for engineering practice.

SUMMARY OF THE INVENTION

In view of the above shortcomings of the prior art, the object of the present invention is to provide a suppression method of high-frequency resonance for the VSC-HVDC system based on nonlinear filter in voltage feed-forward control, which can effectively improve the impedance characteristics of the VSC-HVDC system in the high frequency band, thereby effectively suppressing the high-frequency resonance caused by the impedance matching between the VSC-HVDC system and the AC system.

In order to achieve the above objects, the present invention specifically adopts the following technical schemes.

A suppression method of high-frequency resonance for VSC-HVDC system based on nonlinear filter in voltage feed-forward control is proposed. In the current inner loop control of the VSC-HVDC system, a nonlinear filter is used for the voltage feed-forward link. The specific method is to extract each sequence component of the AC voltage, calculate the average value of the sequence component at sample points, compare the current average value with the output result of nonlinear filter in the previous period, and correct the output result of nonlinear filter in the current period, after corrected, the result acts on the voltage feed-forward link of the inner loop.

A suppression method of high-frequency resonance for VSC-HVDC system based on nonlinear filter in voltage feed-forward control, wherein the steps of the method are as follows:

S1: extract the grid voltage and convert the per-unit value of three-phase instantaneous AC voltage into each sequence component according to Parker transformation;

S2: calculate the average values of four voltage sequence components at N sampling points and obtain $U_{dp\_NAV}$, $U_{qp\_NAV}$, $U_{dn\_NAV}$, $U_{qn\_NAV}$;

S3: compare the current average value of each voltage sequence component with the output of the nonlinear filter in the previous period separately and calculate the deviation $D_{udp\_y}$, $D_{uqp\_y}$, $D_{udn\_y}$, $D_{uqn\_y}$;

S4: correct the output results of respective nonlinear filters in the current period according to the respective voltage deviation values and the fixed values $V_{udp}$, $V_{uqp}$, $V_{udn}$, $V_{uqn}$ with gradient change are obtained;

S5: the output results $V_{udp}$, $V_{uqp}$, $V_{udn}$, $V_{uqn}$ of the nonlinear filters are fixed values which are varied with gradient and acting on the voltage feed-forward link of the inner loop.

In particular, the present invention includes the following preferred solutions. At step S1, the per-unit value of three-phase instantaneous AC voltage is converted into each sequence component, specifically: D-axis positive sequence voltage component $U_{dp}$, Q-axis positive sequence voltage component $U_{qp}$, D-axis negative sequence voltage component $U_{dn}$, and Q-axis negative sequence voltage component $U_{qn}$.

At step S2, the specific calculation method of the average value of the voltage sequence components is:

$$U_{dp\_NAV} = (U_{dp} + U_{dp\_1} + \ldots + U_{dp\_N-2} + U_{dp\_N-1})/N$$

$$U_{qp\_NAV} = (U_{qp} + U_{qp\_1} + \ldots + U_{qp\_N-2} + U_{qp\_N-1})/N$$

$$U_{dn\_NAV} = (U_{dn} + U_{dn\_1} + \ldots + U_{dn\_N-2} + U_{dn\_N-1})/N$$

$$U_{qn\_NAV} = (U_{qn} + U_{qn\_1} + \ldots + U_{qn\_N-2} + U_{qn\_N-1})/N,$$

wherein, $U_{dp\_n}$, $U_{qp\_n}$, $U_{dn\_n}$, $U_{qn\_n}$ are the values at N sampling points of the D-axis positive sequence voltage component $U_{dp}$, the Q-axis positive sequence voltage component $U_{qp}$, the D-axis negative sequence voltage component $U_{dn}$ and the Q-axis negative sequence voltage component $U_{qn}$ respectively, the value of n is from 0 to N−1, a total of N sampling points, $U_{dp\_NAV}$, $U_{qp\_NAV}$, $U_{dn\_NAV}$, $U_{qn\_NAV}$ are the average value of N sample points of D-axis positive sequence voltage component, the Q-axis positive sequence voltage component, the D-axis negative sequence voltage component and the Q-axis negative sequence voltage component respectively.

At step S3, the deviations $D_{udp\_y}$, $D_{uqp\_y}$, $D_{udn\_y}$, $D_{uqn\_y}$ are calculated as:

$$D_{udp\_y} = U_{dp\_NAV} - V_{udp\_1}$$

$$D_{uqp\_y} = U_{qp\_NAV} - V_{uqp\_1}$$

$$D_{udn\_y} = U_{dn\_NAV} - V_{udn\_1}$$

$$D_{uqn\_y} = U_{qn\_NAV} - V_{uqn\_1},$$

wherein, $V_{udp\_1}$, $V_{uqp\_1}$, $V_{udn\_1}$, $V_{uqn\_1}$ are the output values of the nonlinear filter of each sequence component in the previous period respectively; $D_{udp\_y}$, $D_{uqp\_y}$, $D_{udn\_y}$, $D_{uqn\_y}$ are the deviation of D-axis positive sequence voltage component, the Q-axis positive sequence voltage component, the D-axis negative sequence voltage component and the Q-axis negative sequence voltage component respectively.

At step S4, the output result of each nonlinear filter in the current period is corrected according to the voltage deviation. The specific correction method is as follows: the preset threshold X ranges from 0.05 to 0.25 and the preset nonlinear gradient Z ranges from 0.05 to 0.25.

If the deviation of D-axis positive sequence voltage component $D_{udp\_y}$ is greater than the preset threshold value X, the output of the nonlinear filter $V_{udp}$ is equal to the output value of the previous period $V_{udp\_1}$ plus the preset nonlinear gradient Z; if the deviation $D_{udp\_y}$ is less than the preset threshold value −X, the output of the nonlinear filter $V_{udp}$ is equal to the output value of the previous period $V_{udp\_1}$ minus the preset nonlinear gradient Z; if the deviation $D_{udp\_y}$ is between X and −X, the output of the nonlinear filter $V_{udp}$ is equal to the output value of the previous period $V_{udp\_1}$, that is:

$$V_{udp} = V_{udp\_1} + Z, (D_{udp\_y} > X)$$

$$V_{udp} = V_{udp\_1} - Z, (D_{udp\_y} < -X)$$

$$V_{udp} = V_{udp\_1}, (-X \leq D_{udp\_y} \leq X).$$

If the deviation of Q-axis positive sequence voltage component $D_{uqp\_y}$ is greater than the preset threshold value X, the output of the nonlinear filter $V_{uqp}$ is equal to the output value of the previous period $V_{uqp\_1}$ plus the preset non-linear gradient Z; if the deviation $D_{uqp\_y}$ is less than the preset threshold value −X, the output of the non-linear filter $V_{uqp}$ is equal to the output value of the previous period $V_{uqp\_1}$ minus the preset non-linear gradient Z; if the deviation $D_{uqp\_y}$ is between X and −X, the output of the nonlinear filter $V_{uqp}$ is equal to the output value of the previous period $V_{uqp\_1}$, that is:

$$V_{uqp} = V_{uqp\_1} + Z, (D_{uqp\_y} > X)$$

$$V_{uqp} = V_{uqp\_1} - Z, (D_{uqp\_y} < -X)$$

$$V_{uqp} = V_{uqp\_1}, (-X \leq D_{uqp\_y} \leq X).$$

If the deviation of the D-axis negative sequence voltage component $D_{udn\_y}$ is greater than the preset threshold value X, the output of the nonlinear filter $V_{udn}$ is equal to the output value of the previous period $V_{udn\_1}$ plus the preset nonlinear gradient Z; if the deviation $D_{udn\_y}$ is less than the preset threshold value −X, the output of the nonlinear filter $V_{udn}$ is equal to the output value of the previous period $V_{udn\_1}$ minus the preset nonlinear gradient Z; if the deviation $D_{udn\_y}$ is between X and −X, the output of the nonlinear filter $V_{udn}$ is equal to the output value of the previous period $V_{udn\_1}$, that is:

$$V_{udn} = V_{udn\_1} + Z, (D_{udn\_y} > X)$$

$$V_{udn} = V_{udn\_1} - Z, (D_{udn\_y} < -X)$$

$$V_{udn} = V_{udn\_1}, (-X \leq D_{udn\_y} \leq X).$$

If the deviation of the Q-axis negative sequence voltage component $D_{uqn\_y}$ is greater than the preset threshold value X, the output of the nonlinear filter $V_{uqn}$ is equal to the output value of the previous period $V_{uqn}$ plus the preset nonlinear gradient Z; if the deviation $D_{uqn\_y}$ is less than the preset threshold value −X, the output of the nonlinear filter $V_{uqn}$ is equal to the output value of the previous period $V_{uqn\_1}$ minus the preset nonlinear gradient Z; if the deviation $D_{uqn\_y}$ is between X and −X, the output of the nonlinear filter $V_{uqn}$ is equal to the output value of the previous period $V_{uqn\_1}$, that is:

$$V_{uqn} = V_{uqn\_1} + Z, (D_{uqn\_y} > X)$$

$$V_{uqn} = V_{uqn\_1} - Z, (D_{uqn\_y} < -X)$$

$$V_{uqn} = V_{uqn\_1}, (-X \leq D_{uqn\_y} \leq X).$$

The preset threshold X is 0.15 and the preset nonlinear gradient Z is 0.2.

At step S5, the output results $V_{udp}$, $V_{uqp}$, $V_{udn}$, $V_{uqn}$, of the nonlinear filter are fixed values with gradient variation, which acts on the voltage feed-forward link of four inner current loops, namely, positive sequence D-axis, positive sequence Q-axis, negative sequence D-axis and negative sequence Q-axis.

Since the above technical solution is adopted, the present invention has the following advantages:

(1) the present invention can effectively improve the impedance characteristics in high frequency band, thereby effectively suppressing the high-frequency resonance caused by the impedance matching between the VSC-HVDC system and AC system;

(2) it's able to adjust the AC voltage when the voltage disturbance of AC fault occurs taking into account the rapidity so as to reduce the risk of overcurrent of the converter valve;

(3) it only needs to be realized in the secondary control software link without adding a new equipment, which is also low cost, no occupancy of land and convenient for engineering practice.

To some extent, other advantages, objects and features of the invention will be set forth in the description which follows, and based on the following investigation and study, it will be obvious to those skilled in the field, or can be taught from the practice of the present invention.

DETAILED DESCRIPTION

The following is further detailed description of the technical scheme of the application in conjunction with the drawings of the specification and specific embodiments.

Figure 1:
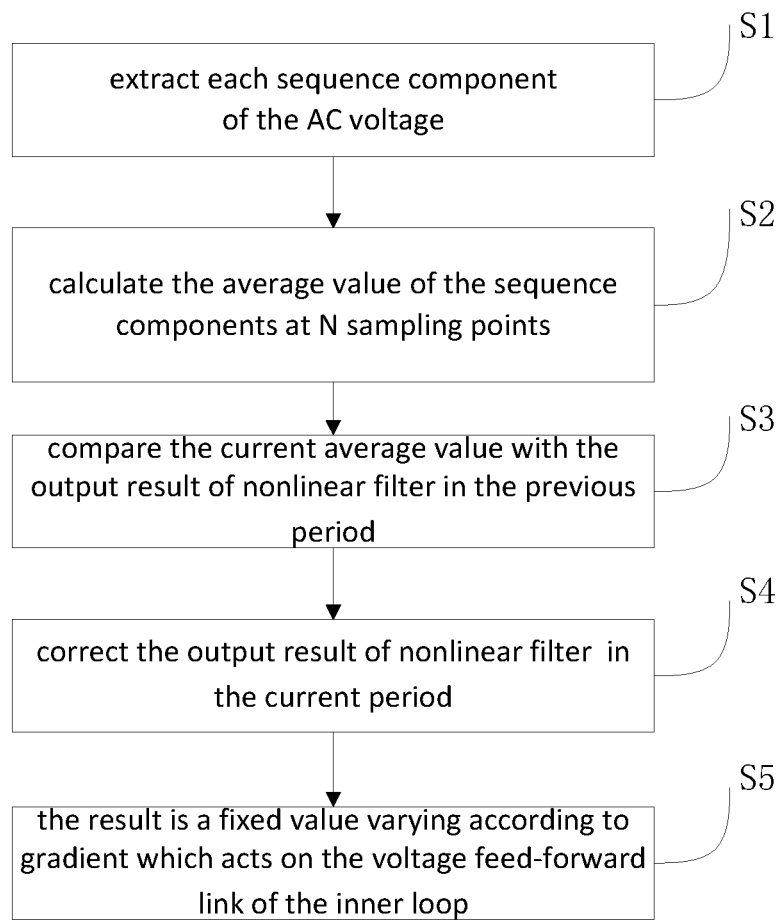
FIG. 1 is a flow chart of a suppression method of high-frequency resonance for VSC-HVDC system based on nonlinear filter in voltage feed-forward control.
Figure 2:
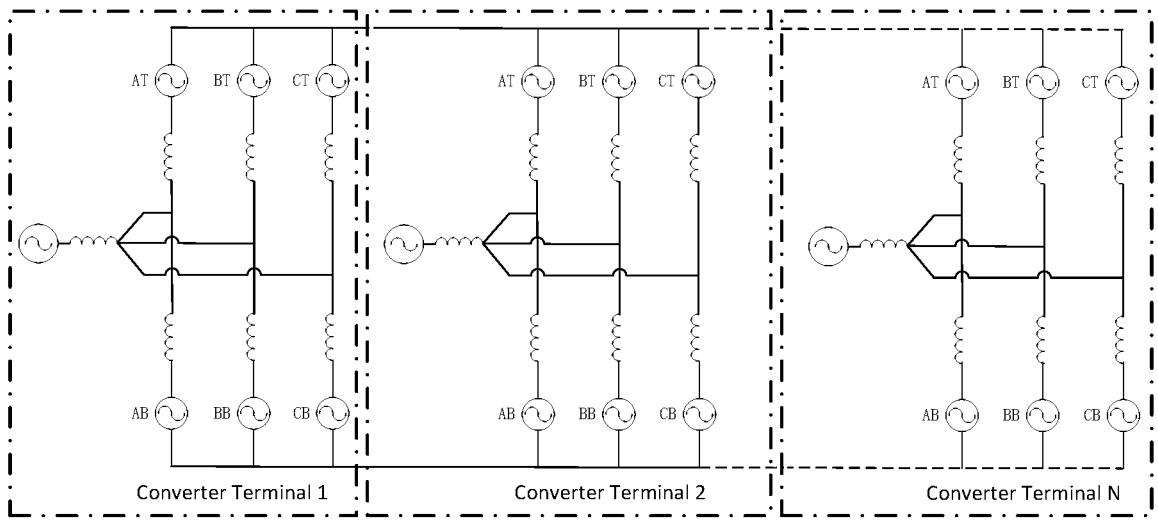
FIG. 2 is a schematic diagram of a VSC-HVDC system.

Turning now to FIG. 1, the harmonic damping control method of the DC side of VSC-HVDC system needs to be configured in each converter terminal, that is, the converter terminal 1, the converter terminal 2 and the converter terminal N shown in FIG. 2. Following is an example of converter terminal 1. The specific implementation process of a suppression method of high-frequency resonance for VSC-HVDC system based on nonlinear filter in voltage feed-forward control is as follows.

Step S1: extract the grid voltage and convert the per-unit values of three-phase instantaneous AC voltage $U_a$, $U_b$, $U_c$ into sequence components according to Parker transformation, specifically: D-axis positive sequence voltage component $U_{dp}$, Q-axis positive sequence voltage component $U_{qp}$, D-axis negative sequence voltage component $U_{dn}$, and Q-axis negative sequence voltage component $U_{qn}$.

Step S2: calculate the average values of four voltage sequence components at N sampling points and obtain $U_{dp\_NAV}$, $U_{qp\_NAV}$, $U_{dn\_NAV}$, $U_{qn\_NAV}$. This embodiment is mainly for high-frequency resonance above 500 Hz, and the cut-off time for calculating the average value is 2 ms. The processing interruption of the known application device is 100 us, and N=20 is calculated, that is, the average value of 20 sampling points is calculated. The values are calculated as follows:

$$U_{dp\_20AV} = )U_{dp} + U_{dp\_1} + \ldots U_{dp\_18} + U_{dp\_19})/20$$

$$U_{qp\_20AV} = )U_{qp} + U_{qp\_1} + \ldots U_{qp\_18} + U_{qp\_19})/20$$

$$U_{dn\_NAV} = )U_{dn} + U_{dn\_1} + \ldots U_{dn\_18} + U_{dn\_19})/20$$

$$U_{qn\_NAV} = )U_{qn} + U_{qn\_1} + \ldots U_{qn\_18} + U_{qn\_19})/20,$$

herein, $U_{dp\_n}$, $U_{qp\_n}$, $U_{qp\_n}$, $U_{qn\_n}$ are the values before N sampling cycles of the D-axis positive sequence voltage component, the Q-axis positive sequence voltage component, the D-axis negative sequence voltage component and the Q-axis negative sequence voltage component respectively.

Step S3: compare the current average value of each voltage sequence component with the output of the nonlinear filter in the previous period and calculate the deviations $D_{udp\_y}$, $D_{uqp\_y}$, $D_{udn\_y}$, $D_{uqn\_y}$ as:

$$D_{udp\_y} = U_{dp\_NAV} - V_{udp\_1}$$

$$D_{uqp\_y} = U_{qp\_NAV} - V_{uqp\_1}$$

$$D_{udn\_y} = U_{dn\_NAV} - V_{udn\_1}$$

$$D_{uqn\_y} = U_{qn\_NAV} - V_{uqn\_1},$$

herein, $V_{udp\_1}$, $V_{uqp\_1}$, $V_{udn\_1}$, $V_{uqn\_1}$ are the output values of the previous period of the nonlinear filter of each sequence component respectively.

Step S4: The output result of each nonlinear filter in the current period is corrected according to the voltage deviation. The specific correction method is as follows: the preset threshold X ranges from 0.05 to 0.25, the optimal value is 0.15, the preset nonlinear gradient Z ranges from 0.05 to 0.25 and the optimal value is 0.2.

The preset threshold value is X=0.15p.u., the initial output value of the nonlinear filter output is 0, and the preset nonlinear step is Z=0.2p.u. If the deviation $D_{udp\_y}$ is greater than the preset threshold value 0.15, the output of the nonlinear filter $V_{udp}$ is equal to the output value of the previous period $V_{udp\_1}$ plus the preset nonlinear gradient 0.2; if the deviation $D_{udp\_y}$ is less than the preset threshold value −0.15, the output of the nonlinear filter $V_{udp}$ is equal to the output value of the previous period $V_{udp\_1}$ minus the preset nonlinear gradient 0.2; if the deviation $D_{udp\_y}$ is between 0.15 and −0.15, the output of the nonlinear filter $V_{udp}$ is equal to the output value of the previous period $V_{udp\_1}$, that is:

$$V_{udp} = V_{udp\_1} + 0.2, (D_{uqn\_y} > 0.15)$$

$$V_{udp} = V_{udp\_1} + 0.2, (D_{uqn\_y} < -0.15)$$

$$V_{udp} = V_{udp\_1} + 0.2, (-0.15 \leq D_{uqn\_y} \leq 0.15).$$

If the deviation $D_{uqp\_y}$ is greater than the preset threshold value 0.15, the output of the nonlinear filter $V_{uqp}$ is equal to the output value of the previous period $V_{uqp\_1}$ plus the preset nonlinear gradient 0.2; if the deviation $D_{uqp\_y}$ is less than the preset threshold value −0.15, the output of the nonlinear filter $V_{uqp}$ is equal to the output value of the previous period $V_{uqp\_1}$ minus the preset nonlinear gradient 0.2; if the deviation $D_{uqp\_1}$ is between 0.15 and −0.15, the output of the nonlinear filter $V_{uqp}$ is equal to the output value of the previous period $V_{uqp\_1}$ that is:

$$V_{uqp} = V_{uqp\_1} + 0.2, (D_{uqp\_y} > 0.15)$$

$$V_{uqp} = V_{uqp\_1} - 0.2, (D_{uqp\_y} < -0.15)$$

$$V_{udp} = V_{udp\_1} + 0.2, (-0.15 \leq D_{uqn\_y} \leq 0.15).$$

If the deviation $D_{udn\_y}$ is greater than the preset threshold value 0.15, the output of the nonlinear filter $V_{udn}$ is equal to the output value of the previous period $V_{udn\_1}$ plus the preset nonlinear gradient 0.2; if the deviation $D_{udn\_y}$ is less than the preset threshold value −0.15, the output of the nonlinear filter $V_{udn}$ is equal to the output value of the previous period $V_{udn\_1}$ minus the preset nonlinear gradient 0.2; if the deviation $D_{udn\_y}$ is between 0.15 and −0.15, the output of the nonlinear filter $V_{udn}$ is equal to the output value of the previous period $V_{udn\_1}$, that is:

$$V_{udn} = V_{udn\_1} + 0.2, (D_{udn\_y} > 0.15)$$

$$V_{udn} = V_{udn\_1} - 0.2, (D_{udn\_y} < -0.15)$$

$$V_{udn} = V_{udn\_1} + 0.2, (-0.15 \leq D_{udn\_y} \leq 0.15).$$

If the deviation $D_{uqn\_y}$ is greater than the preset threshold value 0.15, the output of the nonlinear filter $V_{uqn}$ is equal to the output value of the previous period $V_{uqn\_1}$ plus the preset nonlinear gradient 0.2; if the deviation $D_{uqn\_y}$ is less than the preset threshold value −0.15, the output of the nonlinear filter $V_{uqn}$ is equal to the output value of the previous period $V_{uqn\_1}$ minus the preset nonlinear gradient 0.2; if the deviation $D_{uqn\_y}$ is between 0.15 and −0.15, the output of the nonlinear filter $V_{uqn\_y}$ is equal to the output value of the previous period $V_{uqn\_1}$, that is:

$$V_{uqn} = V_{uqn\_1} + 0.2, (D_{uqn\_y} > 0.15)$$

$$V_{uqn} = V_{uqn\_1} - 0.2, (D_{uqn\_y} < -0.15)$$

$$V_{uqn} = V_{uqn\_1}, (-0.15 \leq D_{uqn\_y} \leq 0.15).$$

Figure 3:
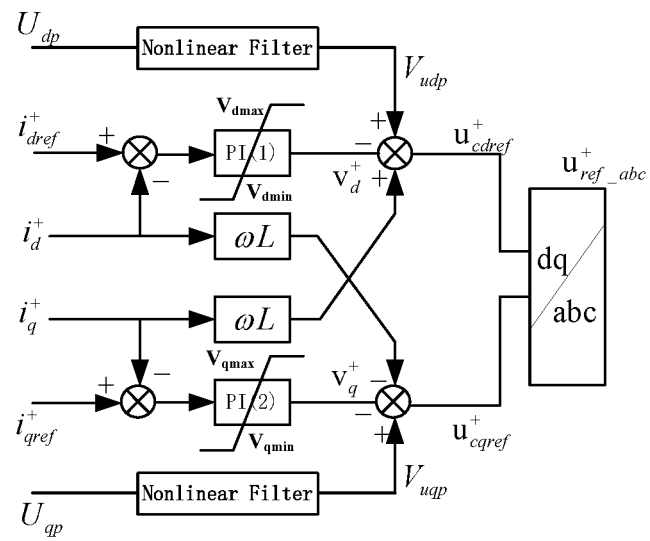
FIG. 3 is a schematic diagram showing the implementation position of voltage feed-forward nonlinear filter in the positive sequence current inner loop.
Figure 4:
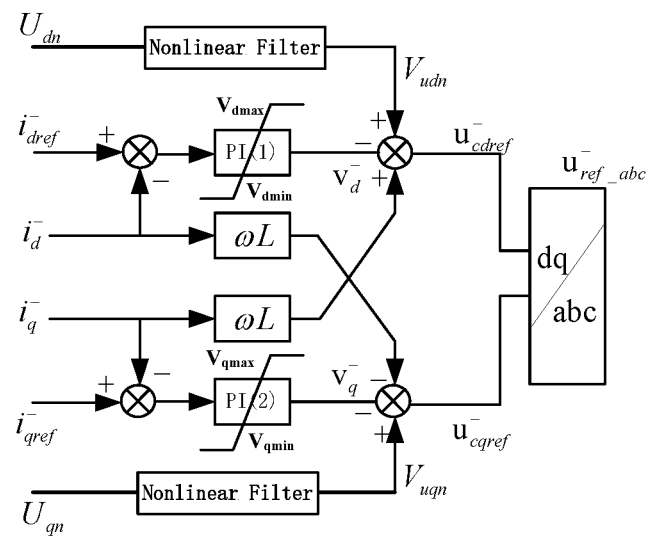
FIG. 4 is a schematic diagram showing the implementation position of voltage feed-forward nonlinear filter in the negative sequence current inner loop.

Step S5: the output results $V_{udp}$, $V_{uqp}$, $V_{udn}$ $V_{uqn}$ of the nonlinear filter is fixed values varied by gradient, and are applied to the voltage feed-forward links of the four current inner loops of the positive sequence D-axis, the positive sequence Q-axis, the negative sequence D-axis, and the negative sequence Q-axis. As shown in FIG. 3 and FIG. 4, in FIG. 3, $U_{dp}$, and $U_{qp}$ are the D-axis positive sequence voltage component and the Q-axis positive sequence voltage component of the grid voltage respectively. $V_{udp}$ and $V_{uqp}$ are the output results of the nonlinear filter. The result $v_d^+$ of the D-axis current reference value $i_{dref}^+$ and the actual value $i_d^+$ is output through PI controller are added with the output $V_{udp}$ of the nonlinear filter and the decoupling term $i_q^+$ multiplied by ωL to obtain the final modulation voltage reference value M of the positive sequence D-axis $u_{cdref}^+$. The result $v_q^+$ of the Q-axis current reference value $i_{qref}^+$ and the actual value $i_q^+$ output through PI controller are added with the output $V_{uqp}$ of the nonlinear filter and the decoupling term $i_q^+$ multiplied by ωL to obtain the final modulation voltage reference value M of the positive sequence Q-axis $u_{cqref}^+$. $u_{cdref}^+$ and $u_{cqref}^+$ are inversely transformed from DQ to ABC to form three-phase modulation voltage $u_{ref\_abc}^+$.

In FIG. 4, $U_{dn}$ and $U_{qn}$ are the D-axis positive sequence voltage component and the Q-axis positive sequence voltage component of the grid voltage respectively. $V_{udn}$ and $V_{nqn}$ are the output results of the nonlinear filter. The result $v_d^-$ of the D-axis current reference value $i_{dref}^-$ and the actual value $i_d^-$ output through PI controller are added with the output $V_{udp}$ of the nonlinear filter and the decoupling term $i_q^-$ multiplied by ωL to obtain the final modulation voltage reference value M of the positive sequence D-axis $u_{cdref}^-$. The result $v_q^-$ of the Q-axis current reference value $i_{qref}^-$ and the actual value $i_q^-$ output through PI controller are added with the output $V_{uqp}$ of the nonlinear filter and the decoupling term $i_q^-$ multiplied by ωL to obtain the final modulation voltage reference value M of the positive sequence Q-axis $u_{cqref}^-$. $u_{cdref}^-$ and $u_{cqref}^-$ are inversely transformed from DQ to ABC to form three-phase modulation voltage $u_{ref\_abc}^-$.

The embodiment is as follows: assuming that the positive sequence voltage component of D-axis $U_{dp}$ after Parker transform is 1.01 p.u. Taking the sampling values of this period together with the first 19 cycles, a total of 20 points are averaged and filtered. Assuming that the average value $D_{udp\_y}$ still 1.01p.u. and the initial value of the filter at the first pass of the nonlinear filter is 0. The deviation between the average value of the current voltage sequence components and the output of the previous period nonlinear filter is calculated as 1.01. Since the deviation of 1.01 is greater than the preset threshold value of 0.15, the output $V_{udp}$ of the nonlinear filter in this period is equal to the output value of the previous period plus the preset nonlinear gradient of 0.2, which acts on the voltage feed-forward link of the inner current loop of the D-axis positive sequence. The current execution period is processed and the next period is calculated the same. In the fifth execution period, the output of the nonlinear filter is 1.0 p.u., which is close to the D-axis positive-sequence voltage component value of 1.01. At the same time, in order to ensure that the output result of the nonlinear filter is reasonable, in this embodiment, the minimum value of the output result of the preset nonlinear filter is −0.4 p.u., and the maximum value of the output result is 1.0 p.u. According to the preset nonlinear gradient of 0.2p.u., the output of the nonlinear filter may only be the following fixed values: −0.4p.u., −0.2p.u., 0 p.u., 0.2p.u., 0.4p.u., 0.6p.u., 0.8p.u., 1.0p.u.

Since the above technical solution is adopted, this present invention has the following advantages:

(1) the present invention can effectively improve the impedance characteristics in high frequency band, thereby effectively suppressing the high-frequency resonance caused by the impedance matching between the VSC-HVDC system and AC system;

(2) it's able to adjust the AC voltage when the voltage disturbance of AC fault occurs taking into account the rapidity so as to reduce the risk of overcurrent of the converter valve.

(3) it only needs to be realized in the secondary control software link without adding a new equipment, which is also low cost, no occupancy of land and convenient for engineering practice.

To some extent, other advantages, objects and features of the invention will be set forth in the description which follows, and based on the following investigation and study, it will be obvious to those skilled in the field, or can be taught from the practice of the present invention.

Finally, it should be noted that the above embodiments are used only to illustrate the technical scheme of the invention, not to limit it. Although the invention is described in detail with reference to the above embodiments, those skilled in the art should understand that the specific embodiments of the invention can still be modified or replaced equally without any modification or modification that departs from the spirit and scope of the present invention. All of them shall be covered by the protection of the rights of the invention.

The invention claimed is:

1. A method for suppressing a high-frequency resonance in a VSC-HVDC system based on a nonlinear filter in a voltage feed-forward control, comprising:
   extracting a three-phase AC voltage from a power grid and converting a per-unit value of the three-phase AC voltage into four voltage sequence components according to Parker transformation;
   for each voltage sequence component of the four voltage sequence components, sampling a voltage of the voltage sequence component at N sampling points respectively to obtain N voltages, and calculating an average value of the N voltages;
   for each voltage sequence component of the four voltage sequence components, comparing the average value of the N voltages with an output of the nonlinear filter in a previous period to obtain a deviation;
   correcting an output result of the nonlinear filter in a current period based on the deviation to obtain a fixed value with gradient change; and
   applying the fixed value with gradient change to the voltage feed-forward control to control the VSC-HVDC system.

2. The method according to claim 1, wherein the four voltage sequence components comprise a D-axis positive sequence voltage component; $U_{dp}$, Q-axis positive sequence voltage component; $U_{qp}$, a D-axis negative sequence voltage component $U_{dn}$ and a Q-axis negative sequence voltage component $U_{qn}$.

3. The method of according to claim 2, wherein the comparing the average value of the N voltages with the output of the nonlinear filter in the previous period to obtain the deviation comprises:

$$D_{udp\_y}=U_{dp\_NAV}-V_{udp\_1}$$

$$D_{uqp\_y}=U_{qp\_NAV}-V_{uqp\_1}$$

$$D_{udn\_y}=U_{dn\_NAV}-V_{udn\_1}$$

$$D_{uqn\_y}=U_{qn\_NAV}-V_{uqn\_1},$$

wherein, $V_{udp\_1}$, $V_{uqp\_1}$, $V_{udn\_1}$, $V_{uqn\_1}$ represent values of the output of the nonlinear filter in the previous period are the D-axis positive sequence voltage component, the Q-axis positive sequence voltage component, the D-axis negative sequence voltage component and the Q-axis negative sequence voltage component, respectively;

wherein $U_{dp\_NAV}$, $U_{qp\_NAV}$, $U_{dn\_NAV}$, $U_{qn\_NAV}$ represents the average value of the N voltages for the D-axis positive sequence voltage component, the Q-axis positive sequence voltage component, the D-axis negative sequence voltage component and the Q-axis negative sequence voltage component, respectively, and wherein $D_{udp\_y}$, $D_{uqp\_y}$, $D_{udn\_y}$, $D_{uqn\_y}$ represent the deviation for the D-axis positive sequence voltage component, the Q-axis positive sequence voltage component, the D-axis negative sequence voltage component and the Q-axis negative sequence voltage component respectively.

4. The method according to claim 3, wherein the correcting the output result of the nonlinear filter in the current period based on the deviation to obtain the fixed value with gradient change comprises:

if the deviation $D_{udp\_y}$ for the D-axis positive sequence voltage component $D_{udp\_y}$ is greater than a first threshold value X, the output result $V_{udp}$ of the nonlinear filter $V_{udp}$ is equal to the output $V_{udp\_1}$ of the nonlinear filter in the previous period $V_{udp\_1}$ plus a preset nonlinear gradient Z; if the deviation $D_{udp\_y}$ is less than a second threshold value $-X$, the output result $V_{udp}$ of the nonlinear filter $V_{udp}$ is equal to the output $V_{udp\_1}$ of the nonlinear filter in the previous period $V_{udp\_1}$ minus the preset nonlinear gradient Z; if the deviation $D_{udp\_y}$ is between the first threshold value X and the second threshold value $-X$, the output result $V_{udp}$ of the nonlinear filter $V_{udp}$ is equal to the output $V_{udp\_1}$ of the nonlinear filter in the previous period $V_{udp\_1}$, that is:

$$V_{udp}=V_{udp\_1}+Z, (D_{udp\_y}>X)$$

$$V_{udp}=V_{udp\_1}-Z, (D_{udp\_y}<-X)$$

$$V_{udp}=V_{udp\_1}, (-X \leq D_{udp\_y} \leq X),$$

if the deviation $D_{uqp\_y}$ for Q-axis positive sequence voltage component is greater than the first threshold value X, the output result $V_{uqp}$ of the nonlinear filter is equal to the output $V_{uqp\_1}$ of the nonlinear filter in the previous period plus the preset non-linear gradient Z; if the deviation $D_{uqp\_y}$ is less than the second threshold value $-X$, the output result $V_{uqp}$ of the non-linear filter is equal to the output $V_{uqp\_1}$ of the nonlinear filter in the previous period minus the preset non-linear gradient Z; if the deviation $D_{uqp\_y}$ is between the first threshold value X and the second threshold value $-X$, the output result $V_{uqp}$ of the nonlinear filter is equal to the output $V_{uqp\_1}$ of the nonlinear filter in the previous period, that is:

$$V_{uqp}=V_{uqp\_1}+Z, (D_{uqp\_y}>X)$$

$$V_{uqp}=V_{uqp\_1}-Z, (D_{uqp\_y}<-X)$$

$$V_{uqp}=V_{uqp\_1}, (-X \leq D_{uqp\_y} \leq X),$$

if the deviation $D_{udn\_y}$ for the D-axis negative sequence voltage component is greater than the first threshold value X, the output result $V_{udn}$ of the nonlinear filter is equal to the output $V_{udn\_1}$ of the nonlinear filter in the previous period plus the preset nonlinear gradient Z; if the deviation $D_{udn\_y}$ is less than the second threshold value $-X$, the output result $V_{udn}$ of the nonlinear filter is equal to the output $V_{udn\_1}$ of the nonlinear filter in the previous period minus the preset nonlinear gradient Z; if the deviation $D_{udn\_y}$ is between the first threshold value X and the second threshold value $-X$, the output result $V_{udn}$ of the nonlinear filter is equal to the output $V_{udn\_1}$ of the nonlinear filter in the previous period, that is:

$$V_{udn}=V_{udn\_1}+Z, (D_{udn\_y}>X)$$

$$V_{udn}=V_{udn\_1}-Z, (D_{udn\_y}<-X)$$

$$V_{udn}=V_{udn\_1}, (-X \leq D_{udn\_y} \leq X),$$

if the deviation $D_{uqn\_y}$ for the Q-axis negative sequence voltage component is greater than the first threshold value X, the output result $V_{uqn}$ of the nonlinear filter is equal to the output $V_{uqn\_1}$ of the nonlinear filter in the previous period plus the preset nonlinear gradient Z; if the deviation $D_{uqn\_y}$ is less than the second threshold value $-X$, the output result $V_{uqn}$ of the nonlinear filter is equal to the output $V_{uqn\_1}$ of the nonlinear filter in the previous period minus the preset nonlinear gradient Z; if the deviation $D_{uqn\_y}$ is between X and $-X$, the output result $V_{uqn}$ of the nonlinear filter is equal to the output $V_{uqn\_1}$ of the nonlinear filter in the previous period, that is:

$$V_{uqn}=V_{uqn\_1}+Z, (D_{uqn\_y}>X)$$

$$V_{uqn}=V_{uqn\_1}-Z, (D_{uqn\_y}<-X)$$

$$V_{uqn}=V_{uqn\_1}, (-X \leq D_{uqn\_y} \leq X),$$

wherein the first threshold value X ranges from 0.05 to 0.25, and the preset nonlinear gradient Z ranges from 0.05 to 0.25.

5. The method according to claim 4, wherein the first threshold value X is 0.15, the second threshold value $-X$ is $-0.15$, and the preset nonlinear gradient Z is 0.2.

* * * * *